US010343925B2

(12) United States Patent
Hong et al.

(10) Patent No.: US 10,343,925 B2
(45) Date of Patent: Jul. 9, 2019

(54) METHOD FOR PREPARING ZEOLITE CATALYST

(71) Applicants: HYUNDAI MOTOR COMPANY, Seoul (KR); KIA MOTORS CORPORATION, Seoul (KR); POSTECH ACADEMY-INDUSTRY FOUNDATION, Pohang-si, Gyeongsangbuk-do (KR)

(72) Inventors: Suk Bong Hong, Pohang-si (KR); Donghui Jo, Gongju-si (KR); Taekyung Ryu, Daejeon (KR); Gi Tae Park, Daegu (KR); In-Sik Nam, Pohang-si (KR); Pyung Soon Kim, Suwon-si (KR); Chang Hwan Kim, Seongnam-si (KR)

(73) Assignees: Hyundai Motor Company, Seoul (KR); KIA Motors Corporation, Seoul (KR); Postech Academy-Industry Foundation, Pohang-si, Gyeongsangbuk-do (KR)

( * ) Notice: Subject to any disclaimer, the term of this patent is extended or adjusted under 35 U.S.C. 154(b) by 0 days.

(21) Appl. No.: 15/368,066

(22) Filed: Dec. 2, 2016

(65) Prior Publication Data
US 2017/0233258 A1   Aug. 17, 2017

(30) Foreign Application Priority Data
Feb. 12, 2016 (KR) ........................ 10-2016-0016512

(51) Int. Cl.
*C01B 39/14* (2006.01)
*B01J 29/76* (2006.01)
*B01D 53/94* (2006.01)

(52) U.S. Cl.
CPC .......... *C01B 39/145* (2013.01); *B01D 53/944* (2013.01); *B01D 53/9418* (2013.01); *B01D 53/9459* (2013.01); *B01J 29/7607* (2013.01); B01D 2255/20738 (2013.01); B01D 2255/20761 (2013.01); B01D 2255/50 (2013.01); B01J 2229/186 (2013.01); B01J 2229/20 (2013.01)

(58) Field of Classification Search
CPC ..... C01B 39/026; C01B 39/14; C01B 39/145; B01J 29/7607; B01J 2229/186
See application file for complete search history.

(56) References Cited

U.S. PATENT DOCUMENTS

| 3,314,752 | A | 4/1967 | Zeolite et al. |
| 8,329,127 | B2 | 12/2012 | Cox |
| 2005/0031535 | A1 | 2/2005 | Mueller et al. |
| 2006/0269620 | A1 | 11/2006 | Morris et al. |
| 2010/0055386 | A1 | 3/2010 | Ohno et al. |
| 2010/0331968 | A1 | 12/2010 | Morris et al. |
| 2011/0300042 | A1 | 12/2011 | Bull et al. |
| 2013/0089494 | A1 | 4/2013 | Reichinger et al. |
| 2013/0195731 | A1 | 8/2013 | Bull et al. |
| 2014/0154175 | A1 | 6/2014 | Li et al. |
| 2014/0170045 | A1 | 6/2014 | Fedeyko et al. |
| 2015/0004094 | A1 | 1/2015 | Schmidt et al. |

FOREIGN PATENT DOCUMENTS

| EP | 2123354 A1 | 11/2009 |
| EP | 2965813 A1 | 1/2016 |
| WO | 00/72965 A1 | 12/2000 |

OTHER PUBLICATIONS

Robson, ed., Verified Synthses of Zeolitic Materals, (2001) Elsevier.*
Feng Bin et al: "Selective catalytic reduction of nitric oxide with ammonia over zirconium-doped copper/ZSM-5 catalysts", Applied Catalysis 8: Environmental, vol. 150-151, No. 151, May 2014 (May 1, 2014), pp. 532-543, XP055382748, Amsterdam, NL ISSN: 0926-3373, DO1: 10.1016/j.apcatb. 2013.12.052.
Badran A H et al: "Studies on the surface area of Fe(III) and Cu(II) ion exchanged zeolites of type A and X using sorption and x-ray powder diffraction", Inorganica Chimica Acta, Elsevier BV, NL, vol. 21, Jan. 1, 1977 (Jan. 1, 1977), pp. 233-238, XP026671593, ISSN: 0020-1693, DOI: 10.1016/S0020-1693(00)86267-2 [retrieved on Jan. 1, 1977].
Ben W. Boal et al: "Facile Synthesis and Catalysis of Pure-Silica and Heteroatom LTA", Chemistry of Materials, vol. 27, No. 22, Nov. 24, 2015 (Nov. 24, 2015), pp. 7774-7779, XP055381605, US ISSN: 0897-4756, DO1: 10.1021/acs.chemater.5b03579.
Han Sik Lee et al: "Redox reactions of copper in zeolite A. Four crystal structures of vacuum-desolvated copper-exchanged zeolite A, Cu8-A", Journal of Physical Chemistry, vol. 85, No. 4, Feb. 1, 1981 (Feb. 1, 1981), pp. 397-405, XP055381588, US ISSN: 0022-3654, DOI: 10.1021/j50604a018.
Michael W Anderson et al: "Electron Spin Echo Study of Cu2+-Doped Zeolite K-ZK4: Cation Location and Adsorbate Interaction", J. Phys. Chem., Jan. 1, 1986 (Jan. 1, 1986), pp. 3206-3212, XP055379416, Retrieved from the Internet: URL:http://pubs.acs.org/doi/pdf/10.1021/j100405a032.
Maggie Zamadics et al: "Effect of divalent cations on the location and coordination of Cu(II) ions in SAPO-42 molecular sieve", Journal of Physical Chemistry, vol. 97, No. 13, Apr. 1, 1993 (Apr. 1, 1993), pp. 3359-3364, XP055381581, US ISSN: 0022-3654, DOI: 10.1021/11001 15a045.

(Continued)

Primary Examiner — David M Brunsman
(74) Attorney, Agent, or Firm — Morgan, Lewis & Bockius LLP

(57) ABSTRACT

A method for manufacturing a zeolite catalyst includes: manufacturing a first Linde Type A (LTA) zeolite using an LTA seed; manufacturing a second LTA zeolite including ions by substituting ions to the first LTA zeolite; and manufacturing a copper LTA zeolite by performing copper ion exchange on the second LTA zeolite.

12 Claims, 2 Drawing Sheets

(56) References Cited

OTHER PUBLICATIONS

Extended European Search Report issued in Application No. 17151392.2 dated Jul. 5, 2017.
Extended European Search Report issued in Application No. 171516633.9 dated Jul. 5, 2017.
D. Jo et al., "Synthesis of High-Silica LTA and UFI Zeolites and NH3-SCR Performance of Their Copper-Exchanged Form", ACS Catal. 6 (2016) 2443-2447.
Metkar et al., "Selective catalytic reduction of NOx on combined Fe— and Cu—zeolite monolithic catalysts: Sequential and dual layer configurations," Applied Catalysis B: Environmental, 11-112, 2012 pp. 67-80.
U.S. Office Action issied in U.S. Appl. No. 15/429,850 dated Aug. 15, 2018.
Final Office Action issued in related U.S. Appl. No. 15/429,850 dated Jan. 30, 2019.

* cited by examiner

METHOD FOR PREPARING ZEOLITE CATALYST

CROSS-REFERENCE TO RELATED APPLICATION

This application claims the benefit of priority to Korean Patent Application No. 10-2016-0016512 filed in the Korean Intellectual Property Office on Feb. 12, 2016, the entire content of which is incorporated herein by reference.

TECHNICAL FIELD

The present disclosure relates to a method for manufacturing a zeolite catalyst. More particularly, the present disclosure relates to a method for manufacturing a zeolite catalyst of which high-temperature performance can be improved.

BACKGROUND

Exhaust gas of conventional diesel vehicles includes carbon monoxide, hydrocarbons, and nitrogen oxides as harmful materials. Nitrogen oxides cause environmental problems such as photochemical smog and acid rain, as well as human diseases. Therefore, there is a demand for improving engines and developing a post-treatment technology of exhaust gas.

One of the most effective technologies for removing nitrogen oxides uses a selective catalytic reduction (SCR) method. This method has been developed according to a reducing agent such as ammonia (NH3), urea, hydrocarbon (HC), and the like, and various catalysts. Ammonia ($NH_3$) has been known to be effective in removing nitrogen oxides from a fixed object such as a power plant and an incinerator. Since there is a problem of storage/transport and use of ammonia, in case of a moving object such as a vehicle, urea has been known to be effective as it is capable of being easily decomposed to ammonia by heat decomposition and a hydration reaction.

As the catalyst for use in the selective catalyst reduction method, zeolite-based catalysts such as copper(Cu)/zeolite having excellent functions has been developed.

In particular, high temperature activity of such a catalyst is very important in treatment of high-temperature exhaust gas.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide a method for manufacturing a zeolite catalyst of which high-temperature performance can be improved.

A method for manufacturing a zeolite catalyst according to an exemplary embodiment in the present disclosure includes: manufacturing a first Linde Type A (LTA) zeolite using an LTA seed; manufacturing a second LTA zeolite including ions by substituting ions to the first LTA zeolite; and manufacturing a copper LTA zeolite by performing copper ion exchange on the second LTA zeolite.

The manufacturing the second LTA zeolite may include injecting the first LTA zeolite into an ammonium salt solution to react them and then performing drying, and the ammonium salt may be ammonium nitrate ($NH_4NO_3$).

The performing the copper ion exchange on the second LTA zeolite may include injecting the second LTA zeolite to a copper precursor solution and then stirring.

The method for manufacturing the zeolite catalyst may further include, after the manufacturing the copper LTA zeolite, performing heat treatment on the copper LTA zeolite.

The heat treatment may be performed while increasing a temperature to 400° C. to 750° C. at a rate of 1 to 30° C./min.

The heat treatment may be performed for about 1 to 24 h.

A Si/Al ratio of the zeolite catalyst may be 5 to 30.

A method for manufacturing a zeolite catalyst according to another exemplary embodiment in the present disclosure includes manufacturing a first LTA zeolite using an LTA seed; manufacturing a second LTA zeolite including ions by substituting ions to the first LTA zeolite; and manufacturing an iron LTA zeolite by performing iron ion exchange on the second LTA zeolite.

The performing the iron ion exchange on the second LTA zeolite may further include mixing the second LTA zeolite with at least one of iron(III) nitrate nonahydrate ($Fe(NO_3)_3 \cdot 9H_2O$), sulfuric acid hydrate ($FeSO_4 \cdot 7H_2O$), iron(II) oxalate dihydrate ($FeC_2O_4 \cdot 2H_2O$), and iron(III) chloride tetrahydrate ($FeCl_2 \cdot 4H_2O$) and stirring.

The method for manufacturing the zeolite catalyst may further include, after the performing of the iron ion exchange on the second LTA zeolite, performing heat treatment on the iron LTA zeolite.

A method for manufacturing a zeolite catalyst according to another exemplary embodiment in the present disclosure includes: preparing a first mixture by mixing a 1,2-dimethyl-3-(4-methylbenzyl)imidazolium hydroxide aqueous solution, aluminum hydroxide ($Al(OH)_3$), and tetramethylammonium hydroxide pentahydrate; preparing a second mixture by mixing tetraethyl orthosilicate (TEOS) ($Si(OC_2H_5)_4$) into the first mixture and then mixing an LTA seed thereto; preparing a third mixture by evaporating ethanol and water contained in the second mixture; preparing a first LTA zeolite by mixing a hydrofluoric aqueous solution into the third mixture, heating, and then performing drying; preparing a second LTA zeolite including $NH_4^+$ ions by injecting the first LTA zeolite into an ammonium nitrate ($NH_4NO_3$) solution to react them and then drying; and preparing a third LTA zeolite by injecting the second LTA zeolite into a copper acetate monohydrate solution to react them and then performing drying.

In the method for manufacturing the zeolite catalyst according to the exemplary embodiment in the present disclosure, acidity is low and thus high-temperature performance of the catalyst can be improved while reducing the amount of urea consumption.

A copper zeolite catalyst according to an exemplary embodiment in the present disclosure is manufactured by manufacturing a first Linde Type A (LTA) zeolite using an LTA seed; manufacturing a second LTA zeolite including ions by substituting ions to the first LTA zeolite; and manufacturing a copper LTA zeolite by performing copper ion exchange on the second LTA zeolite.

An iron zeolite catalyst according to another exemplary embodiment in the present disclosure is manufactured by manufacturing a first LTA zeolite using an LTA seed; manufacturing a second LTA zeolite including ions by substituting ions to the first LTA zeolite; and manufacturing an iron LTA zeolite by performing iron ion exchange on the second LTA zeolite.

A zeolite catalyst according to an exemplary embodiment in the present disclosure include LTA zeolite including copper ion, and the Si/Al ratio of the LTA zeolite may be 5 to 30.

DETAILED DESCRIPTION OF THE EMBODIMENTS

Figure 1:
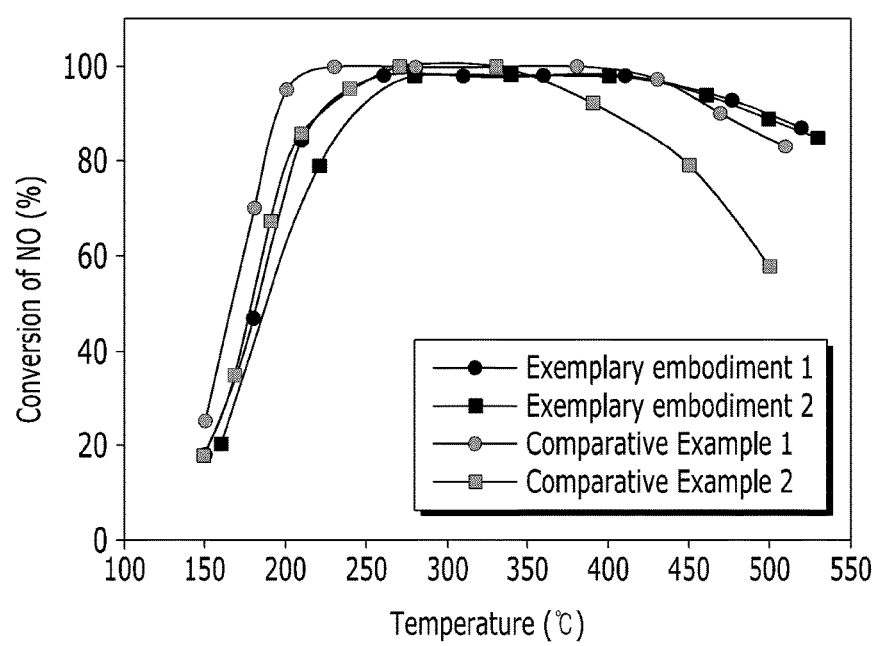
FIG. 1 is a graph illustrating a measurement result of removal of nitrogen oxide of a zeolite catalyst in various temperature ranges according to an exemplary embodiment in the present disclosure and a comparative example.

The present disclosure will be described more fully hereinafter with reference to the accompanying drawings, in which exemplary embodiments are shown. As those skilled in the art would realize, the described embodiments may be modified in various different ways, all without departing from the spirit or scope of the present disclosure.

The drawings and description are to be regarded as illustrative in nature and not restrictive, and like reference numerals designate like elements throughout the specification.

In addition, unless explicitly described to the contrary, the word "comprise" and variations such as "comprises" or "comprising" will be understood to imply the inclusion of stated elements but not the exclusion of any other elements.

Hereinafter, a method for manufacturing a zeolite catalyst according to an exemplary embodiment in the present disclosure will be described in detail.

First, a method for preparing zeolite for manufacturing a zeolite catalyst according to the exemplary embodiment in the present disclosure will be described.

As the zeolite catalyst according to the present disclosure, a Linde Type A (LTA) zeolite may be used.

In order to prepare the LTA zeolite, an LTA seed is mixed in a mixture of aluminum hydroxide ($Al(OH)_3$) and tetraethyl orthosilicate ($Si(OC_2H_5)_4$).

Specifically, a 1,2-dimethyl-3-(4-methylbenzyl)imidazolium hydroxide aqueous solution and aluminum hydroxide ($Al(OH)_3$) are mixed and the mixture is primarily stirred, and then tetramethylammonium hydroxide pentahydrate is additionally mixed and then secondarily stirred so as to prepare a first mixture.

Here, with respect to the total weight of the first mixture, 20-35 wt % of 1,2-dimethyl-3-(4-methylbenzyl)imidazolium hydroxide, 1-2 wt % of aluminum hydroxide (Al$(OH)_3$), 1-5 wt % of tetramethylammonium hydroxide pentahydrate, and a residual quantity of water are mixed, and the primary stirring and the secondary stirring may be respectively performed for about 0.5 to 1.5 h.

Tetraethyl orthosilicate (TEOS) ($Si(OC_2H_5)_4$) is mixed into the first mixture and then third stirring is performed, and then the LTA seed is mixed and fourth stirring is performed so as to prepare a second mixture.

30-35 wt % of TEOS may be mixed with respect to the total weight of the second mixture, and the amount of LTA seed may be 2-6 wt % with respect to the total weight of the entire silicon included in LTA zeolite.

In addition, the third stirring may be performed for about 2 to 4 h, and the fourth stirring may be performed for about 20 to 28 h.

Next, the second mixture is sufficiently heated to cause hydrolysis of the TEOS, and ethanol and water generated from the hydrolysis of TEOS are evaporated such that a third mixture is prepared.

The second mixture may be heated at a temperature between 70° C. and 90° C.

Next, a hydrofluoric aqueous solution is mixed in the third mixture, and a fourth mixture is prepared through heating, cleansing, and drying processes.

Here, the third mixture may be heated for a constant time period at a temperature of about 150° C. to 200° C., the cleansing process may be iteratively performed, and the drying process may be performed at room temperature.

Next, heat treatment is additionally performed to remove an organic material from the fourth mixture such that the LTA zeolite for manufacturing the zeolite catalyst according to the exemplary embodiment in the present disclosure is manufactured.

The heat treatment may be performed at a temperature between 500° C. and 700° C. for about 6 to 10 h, and a Si/Al ratio of the LTA zeolite may be 5 to 30 in the exemplary embodiment.

Next, a method for manufacturing a zeolite catalyst according to an exemplary embodiment in the present disclosure using the above-prepared LTA zeolite will be described in detail.

First, the LTA zeolite is put into ammonium salt and refluxed, and then cleansing and drying processes are performed to prepare an LTA zeolite including $NH_4^+$ ions (i.e., $NH_4$ type of LTA zeolite).

Here, the ammonium salt may be ammonium nitrate ($NH_4NO_3$).

The reflux process may be performed at a temperature between 60° C. and 100° C. for about 5 to 7 h.

Next, the dried $NH_4$ type of LTA zeolite including $NH_4^+$ ions undergoes copper (Cu) ion exchange such that a copper (Cu) LTA zeolite including copper ions is prepared.

For the copper ion exchange, the dried $NH_4$ type of LTA zeolite including $NH_4^+$ ions is injected into a copper precursor solution such as copper acetate monohydrate, copper nitride, copper nitrate, copper sulfate, and the like, and stirred, and then cleansing and drying processes are performed such that the Cu type of LTA zeolite can be prepared.

As a possible alternative, the $NH_4$ type of LTA zeolite may undergo iron (Fe) ion exchange such that a Fe type of LTA zeolite including Fe ions can be prepared in another exemplary embodiment in the present disclosure.

When the Fe ion exchange is performed, iron chloride tetrahydrate ($FeCl_2 \cdot 4H_2O$) may be used instead of using copper acetate monohydrate.

Then, the Cu type of LTA zeolite is heated in an oven with a gradually increasing temperature, and then a heat treatment process is performed such that the zeolite catalyst according to the exemplary embodiment in the present disclosure is manufactured.

Here, for the heat temperature of the Cu type of LTA zeolite, the temperature may be increased to 400 to 750° C. at a rate of 1 to 30° C./min, and then the heat treatment may be performed to about 1 to 24 h.

Hereinafter, an experimental example in the present disclosure will be described. However, the following experimental example is just one of experimental examples of the present disclosure, and thus, the present disclosure is not limited thereto.

Experimental Example: LTA Zeolite Catalyst Preparation

1 LTA Zeolite Preparation

In a plastic beaker, with respect to the total weight of an aqueous solution, 29.4 wt % (12.38 g) of 1,2-dimethyl-3-(4-methylbenzyl)imidazolium hydroxide aqueous solution and 0.1733 g of aluminum hydroxide were mixed and then stirred for about 1 h, and then tetramethylammonium hydroxide pentahydrate at 0.4152 g was additionally mixed therein and then stirred for about 1 h.

Next, tetraethyl orthosilicate (TEOS) at 6.80 g was mixed therein and then stirred for about 3 h, 4 wt % of LTA seed with respect to the entire silica injected thereto was added thereto and then stirred for about 24 h, and the mixture was heated at 80° C. to cause hydrolysis of the TEOS such that 5.90 g of ethanol and 5.37 g of water generated from the hydrolysis were evaporated.

Next, with respect to the total weight of the aqueous solution, 48 wt % (0.577 ml) of a hydrofluoric aqueous solution was mixed therein.

Then, the mixture to which the hydrofluoric aqueous solution was added was injected into a steel container and then heated at 175° C. for about 17 h while rotating the container at a speed of 60 rpm such that a solid product was generated, and the solid product was iteratively cleansed and then dried at room temperature.

In order to remove an organic material from the dried mixture, the dried mixture was heat-treated at 600° C. in a muffle furnace for about 8 h to thereby manufacture an LTA zeolite, XRD analysis was performed on the manufactured zeolite to determine that the zeolite had an LTA structure, and a Si/Al ratio was determined to be 16 through ICP analysis.

2 Zeolite Catalyst Preparation 2 g of the manufactured LTA zeolite and 100 ml of 1 M ammonium nitrate were mixed in a two-neck flask, and the mixture was refluxed at 80° C. for about 6 h.

Next, the mixture was iteratively cleansed with a filter and distilled water and then dried at room temperature, and the cleansing and drying processes were repeated two times such that an $NH_4$ type of LTA zeolite was manufactured.

The dried $NH_4$ type of LTA zeolite was injected into 100 ml of a 0.01 M copper acetate monohydrate (Cu $(OAc)_2 \cdot H_2O$) solution and then stirred at room temperature for about 6 h.

Next, cleansing with a filter and distilled water and drying at room temperature were repeated three times such that a Cu type of LTA zeolite was manufactured, and the Cu type of LTA zeolite was heated to 550° C. at a rate of 2° C./min at an oven and then heat treatment was performed for about 8 h so as to manufacture the zeolite catalyst according to the exemplary embodiment in the present disclosure.

In order to determine a removal rate of nitrogen oxide in the zeolite catalyst according to the exemplary embodiment in the present disclosure, an experiment was performed to measure a removal rate of the nitrogen oxide per temperature, and a result of the experiment is shown in FIG. 1.

FIG. 1 is a graph illustrating a result of an experiment performed to measure a removal rate of nitrogen oxide in the zeolite catalyst according to an exemplary embodiment in the present disclosure and in a zeolite catalyst according to a comparative example in various temperature ranges.

In FIG. 1, the horizontal axis denotes a temperature (° C.) and the horizontal axis denotes a removal rate (%) of nitrogen oxide.

As the zeolite catalyst according to the comparative example, Cu/SSZ-13 (Si/Al=14) was used.

In order to determine high-temperature performance of the zeolite catalyst according to the exemplary embodiment in the present disclosure, two zeolite catalysts, one with no treatment (Exemplary Embodiment 1) and the other one having undergone heat treatment at 750° C. for about 24 h with air containing 10% humidity (Exemplary Example 2), were respectively used in experiments.

In addition, in order to determine high-temperature performance of Cu/SSZ-13, two catalysts, one with no treatment (Comparative Example 1) and the other one having undergone heat treatment at 750° C. for about 24 h with air containing 10% humidity (Comparative Example 2), were respectively used in experiments.

In order to determine a removal rate per temperature, the zeolite catalysts of the exemplary embodiments and the comparative examples were supplied with nitrogen ($N_2$) at a gas hourly space velocity (GHSV) of 100,000, and a removal rate of nitrogen oxide was measured while changing the temperature between 150° C. and 550° C.

First, referring to FIG. 1, the nitrogen oxide removal rate of Exemplary Embodiment 1 is similar to that of Comparative Example 1 until the temperature reaches 400° C., but when the temperature exceeds 400° C., the nitrogen oxide removal rate of Exemplary Embodiment 1 is excellent compared to Comparative Example 1.

In addition, in Exemplary Embodiment 2, the nitrogen oxide removal rate was about 30% better than Comparative Example 2 from a zone where the temperature exceeds 300° C.

Hereinafter, an example of application of the zeolite catalyst manufactured according to the method for manufacturing the zeolite catalyst according to an exemplary embodiment in the present disclosure will be described with reference to FIG. 2.

Figure 2:
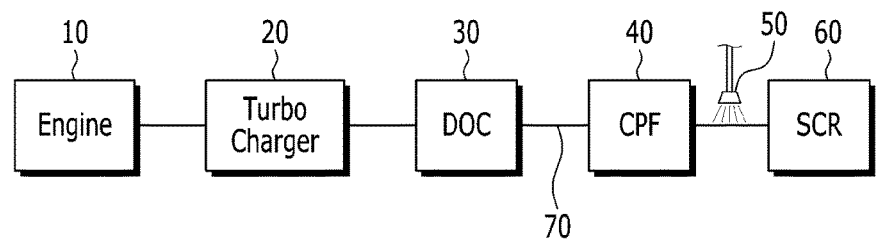
FIG. 2 is a block diagram of an exhaust gas purification device that employs the zeolite catalyst according to the exemplary embodiment in the present disclosure.

FIG. 2 is a block diagram of an exhaust gas purification device to which a zeolite catalyst according to an exemplary embodiment in the present disclosure is applied.

As shown in FIG. 2, an exhaust gas generated from an engine 10 sequentially passes a turbocharger 20, a diesel oxidation catalyst (DOC) device 30, a catalyzed particulate filter 40, a spray nozzle 50, and a selective catalytic reduction (SCR) device 60 such that harmful materials in the exhaust gas are removed. Here, the turbocharger 20, the DOC device 30, the CPF 40, the spray nozzle 50, and the SCR device 60 may be installed in an exhaust pipe 70.

The engine 10 includes a plurality of cylinders (not shown) for combustion of an air mixture. The cylinder is connected with an intake manifold (not shown) to receive the air mixture, and the intake manifold is connected with an intake pipe (not shown) to receive external air.

Further, the cylinder is connected with an exhaust manifold (not shown) such that exhaust gas generated during a combustion process is collected in the exhaust manifold. The exhaust manifold is connected with the exhaust pipe 70.

The turbocharger 20 rotates a turbine (not shown) using energy of the exhaust gas so as to increase the air intake amount.

The DOC device 30 may be provided in a rear end of the turbocharger 20. In the DOC device 30, HC and CO are oxidized and NO is oxidized to $NO_2$. In addition, in order to effectively generate $NO_2$, at least one of the zeolite catalyst, which has ion-exchanged with a transition metal and manufactured according to the above-described method of the present disclosure and a noble metal may be included in the DOC device 30, and the zeolite catalyst manufactured according to the above-described method of the present disclosure may be used as a supporter of a cold start catalyst (CSC) that intercalates NOx generated at an initial cold-starting in the DOC device 30.

The CPF 40 is provided in a rear end of the DOC device 30, and includes a catalyst filter CPF.

The CPF 40 collects particulate matter (PM) in the exhaust gas and regenerates the collected PM (i.e., soot). The regeneration of soot is performed when a pressure difference between an inlet and an outlet of the CPF 40 is higher than a predetermined pressure.

The spray nozzle 50 is provided between the CPF 40 and the SCR device 60 and sprays a reducing agent to an exhaust oxidized in the DOC device 30 and the CPF 40. The reducing agent may be ammonia, and generally urea is sprayed from the spray nozzle 50 and the sprayed urea is decomposed to ammonia.

The exhaust gas mixed with the reducing agent and $NO_2$ generated from the DPC device 30 is supplied to the SCR device 60.

The SCR device 60 is provided in a rear end of the spray nozzle 50, and includes the zeolite catalyst ion-exchanged with the transition metal, manufactured according to the above-described method of the present disclosure. The SCR device 60 reduces $NO_x$ in the exhaust gas to nitrogen gas $N_2$ using $NO_2$ generated from the DOC device 30 and the reducing agent such that $NO_x$ in the exhaust gas can be reduced.

Further, the Cu type of LTA zeolite catalyst according to the present disclosure, which can be applied to the DOC device 30 and the SCR device 60, may be solely used or mixed with a Cu type of SSZ-13 catalyst. When the Cu type of SSZ-13 catalyst and the Cu type of LTA zeolite catalyst according to the exemplary embodiment in the present disclosure are mixed, low-temperature performance and high-temperature performance can be more improved.

As described, in the method for manufacturing the zeolite catalyst according to the present disclosure, acidity is low and thus the high-temperature performance of the catalyst can be improved while reducing the amount of consumption of urea.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A method for manufacturing a zeolite catalyst, the method comprising steps of:
   manufacturing a first Linde Type A (LTA) zeolite, which includes first ions, using an LTA seed;
   manufacturing a second LTA zeolite including second ions by substituting the second ions in place of the first ions in the first LTA zeolite; and
   manufacturing a copper LTA zeolite by substituting copper ions in place of the second ions in the second LTA zeolite;
   wherein an Si/Al molar ratio of the zeolite catalyst is 5 to 30.

2. The method for of claim 1, wherein the step of manufacturing the second LTA zeolite comprises mixing the first LTA zeolite with an ammonium salt solution to react them and then performing drying, and
   wherein the ammonium salt is ammonium nitrate ($NH_4NO_3$).

3. The method of claim 1, wherein the step of substituting the copper ions in place of the second ions in the second LTA zeolite comprises: mixing the second LTA zeolite to a copper precursor solution and then stirring.

4. The method of claim 3, further comprising, after the step of manufacturing the copper LTA zeolite: performing heat treatment on the copper LTA zeolite.

5. The method of claim 4, wherein the heat treatment is performed while increasing a temperature to 400° C. to 750° C. at a rate of 1 to 30° C./min.

6. The method of claim 5, wherein the heat treatment is performed for about 1 to 24 h.

7. A method for manufacturing a zeolite catalyst, the method comprising steps of:
   manufacturing a first LTA zeolite, which includes first ions, using an LTA seed;
   manufacturing a second LTA zeolite including ions by substituting second ions in place of ions in the first LTA zeolite; and
   manufacturing an iron LTA zeolite by substituting iron ions in place of the second species ions in the second LTA zeolite.

8. The method of claim 7, wherein the step of manufacturing the second LTA zeolite comprises: mixing the first LTA zeolite with an ammonium salt solution to react them and then performing drying, and
   wherein the ammonium salt is ammonium nitrate ($NH_4NO_3$).

9. The method of claim 8, wherein the step of substituting the iron ions in place of the second ions in the second LTA zeolite further comprises: mixing the second LTA zeolite with at least one of iron(III) nitrate nonahydrate (Fe$(NO_3)_3 \cdot 9H_2O$), sulfuric acid hydrate ($FeSO_4 \cdot 7H_2O$), iron(II) oxalate dihydrate ($FeC_2O_4 \cdot 2H_2O$), and iron(III) chloride tetrahydrate ($FeCl_2 \cdot 4H_2O$) and stirring.

10. The method of claim 9, further comprising, after the step of substituting iron ions in place of the second ions in the second LTA zeolite:
    performing heat treatment on the iron LTA zeolite.

11. The method for manufacturing the zeolite catalyst of claim 7, wherein a Si/Al molar ratio of the zeolite catalyst is 5 to 30.

12. A method for manufacturing a zeolite catalyst, the method comprising:
    preparing a first mixture by mixing a 1,2-dimethyl-3-(4-methylbenzyl)imidazolium hydroxide aqueous solution, aluminum hydroxide ($Al(OH)_3$), and tetramethylammonium hydroxide pentahydrate;
    preparing a second mixture by mixing tetraethyl orthosilicate (TEOS) ($Si(OC_2H_5)_4$) into the first mixture and then mixing an LTA seed thereto;
    preparing a third mixture by evaporating ethanol and water contained in the second mixture;
    preparing a first LTA zeolite by mixing a hydrofluoric aqueous solution into the third mixture, heating, and then performing drying;
    preparing a second LTA zeolite including $NH_4^+$ ions by mixing the first LTA zeolite with an ammonium nitrate ($NH_4NO_3$) solution to react them and then drying; and
    preparing a third LTA zeolite by mixing the second LTA zeolite with copper acetate monohydrate solution to react them and then performing drying.

* * * * *